US011930908B2

(12) United States Patent
Li

(10) Patent No.: US 11,930,908 B2
(45) Date of Patent: Mar. 19, 2024

(54) AIRTIGHT LIPSTICK

(71) Applicant: Shantou Kinhwa Plastic Industry Co., Ltd, Guangdong (CN)

(72) Inventor: Weixiong Li, Guangdong (CN)

( * ) Notice: Subject to any disclaimer, the term of this patent is extended or adjusted under 35 U.S.C. 154(b) by 422 days.

(21) Appl. No.: 17/598,912

(22) PCT Filed: Dec. 6, 2019

(86) PCT No.: PCT/CN2019/123511

§ 371 (c)(1),
(2) Date: Sep. 28, 2021

(87) PCT Pub. No.: WO2021/103107

PCT Pub. Date: Jun. 3, 2021

(65) Prior Publication Data

US 2022/0160099 A1 May 26, 2022

(30) Foreign Application Priority Data

Nov. 29, 2019 (CN) ......................... 201922127817.6

(51) Int. Cl.

| | |
|---|---|
| ***A45D 40/04*** | (2006.01) |
| ***A45D 40/00*** | (2006.01) |
| ***A45D 40/06*** | (2006.01) |
| ***A61Q 1/06*** | (2006.01) |

(52) U.S. Cl.

CPC ............. *A45D 40/00* (2013.01); *A45D 40/04* (2013.01); *A45D 40/065* (2013.01); *A61Q 1/06* (2013.01); *A45D 2040/0025* (2013.01); *A45D 2200/051* (2013.01)

(58) Field of Classification Search

CPC ....... A45D 40/04; A45D 40/06; A45D 40/065

See application file for complete search history.

(56) References Cited

U.S. PATENT DOCUMENTS

| | | | | |
|---|---|---|---|---|
| 8,651,759 B2 * | 2/2014 | Takahashi | ............. | A45D 40/00 206/385 |
| 11,700,932 B2 * | 7/2023 | Seo | ........................ | A45D 40/06 401/68 |
| 2019/0313769 A1 * | 10/2019 | Chan | ...................... | A45D 40/06 |

FOREIGN PATENT DOCUMENTS

KR 20210020255 A * 2/2021

* cited by examiner

*Primary Examiner* — Jennifer C Chiang

(57) ABSTRACT

An airtight lipstick, including an outer cover, an inner cover, a central core and a base; the inner cover is fixedly arranged within the outer cover; the base is internally provided with a cavity; the central core is arranged within the cavity; the central core is adapted to accommodate a lipstick mass; a bottom part of the outer cover removably snaps onto the base; a lower part of the inner cover is in an interference fit with an upper part of an inner wall of the cavity to achieve sealing effect. A stable structure is thus provided that only requires the inner cover to produce a smaller amount of elastic deformation to provide the lipstick container with airtightness, and is not easy to cause air leakage of the lipstick container due to misalignment, and hence more durable.

5 Claims, 4 Drawing Sheets

AIRTIGHT LIPSTICK

BACKGROUND OF THE INVENTION

The present utility model relates to the field of lipsticks and more particularly an airtight lipstick.

A lipstick is a lip cosmetic product which can make the lips rosy and shiny with the effects of moisturizing and protecting. To ensure that a lipstick can moisturize the lips, a lipstick mass needs to be isolated from air during storage. If a lipstick mass is not isolated from air when it is stored, the moisture in the mass will gradually evaporate and drain, and thus the lipstick mass will lose its moisturizing effect on the lips. Meanwhile, when a lipstick mass contacts frequently with air, dust and bacteria in the air will contaminate the mass and lead to certain potential hazards to health and safety.

Therefore, there is a lipstick container with certain degree of airtightness existing in the market. For instance, a Chinese patent CN208030584U (application number: 201721773642.0) has disclosed a containing tube with good sealing performance comprising a cover, a central core, and a base; the cover comprises an outer cover and an inner cover; an inner surface of the inner cover is provided with a convex ring that is in interference fit with an outer surface of the base to achieve sealing mainly through the interference fit between the convex ring on the inner surface of the inner cover and a surface of a base portion of the base facing towards the convex ring. This sealing structure has a relatively poor stability which will cause air leakage if the inner cover and the base are misaligned. Meanwhile, this sealing structure provides the containing tube with airtightness mainly through sleeving the inner wall of the inner cover onto the corresponding surface of the base portion of the base, and the base portion will expand the inner cover radially against the inner wall, so that the inner cover will be elastically deformed and abut the corresponding surface of the base portion of the base under the effect of elastic deformation. A containing tube using this sealing structure generally requires a greater elastic deformation of the inner cover to be completely sealed. However, the inner cover is generally made of soft rubber or plastic, which, after using for a certain period of time, will easily cause fatigue failure of the inner cover undergoing a large amount of elastic deformation; as a result, it can no longer produce elastic deformation and cannot abut to the corresponding surface of the base portion of the base after being expanded, thus making the containing tube ineffective.

BRIEF SUMMARY OF THE INVENTION

It is an object of the present utility model to provide an airtight lipstick with a stable structure which is not susceptible to air leakage and functional failure.

To attain this, the present utility model discloses an airtight lipstick comprising an outer cover, an inner cover, a central core and a base; the inner cover is fixedly arranged inside the outer cover; the base is internally provided with a cavity; the central core is arranged within the cavity; the central core is adapted to accommodate a lipstick mass; a bottom part of the outer cover removably snaps onto the base; a lower part of the inner cover is in an interference fit with an upper portion of an inner wall of the base to achieve sealing effect.

Preferably, the lower part of the inner cover is inserted into the base, and the upper portion of the inner wall of the base is provided with a sealing portion that is in interference fit with the lower part of the inner cover; the lower part of the inner cover is matingly connected to the sealing portion, so as to render the cavity hermetic and airtight.

Preferably, a sealing convex ring is provided on an outer wall of the lower part of the inner cover or on the sealing portion.

Preferably, a middle portion of an inner wall of the outer cover is provided with a plurality of stop posts and stop protrusions; the stop protrusions are arranged below the stop posts; a middle portion of an outer wall of the inner cover is provided with a clamping portion, and the clamping portion is clamped between the stop posts and the stop protrusions, so that the inner cover is fixedly clamped inside the outer cover.

Preferably, a bottom portion of the inner wall of the outer cover is provided with a plurality of grooves; an upper part of an outer wall of the base is provided with a plurality of strip protrusions, and the outer cover is matingly snapped to an upper part of the base through the grooves and the strip protrusions.

In comparison to existing technology, the beneficial effects of the present utility model include:

The present utility model achieves airtightness of a lipstick container through a lower part of an outer wall of the inner cover being in an interference fit with an inner wall of the base, which is a stable structure that only requires the inner cover to produce a smaller amount of elastic deformation to provide the lipstick container with airtightness, and is not easy to cause air leakage of the lipstick container due to misalignment. In comparison to existing technology, the inner cover of the present utility model is not susceptible to fatigue failure, and hence being more durable with better airtightness.

DETAILED DESCRIPTION OF THE INVENTION

Figure 1:
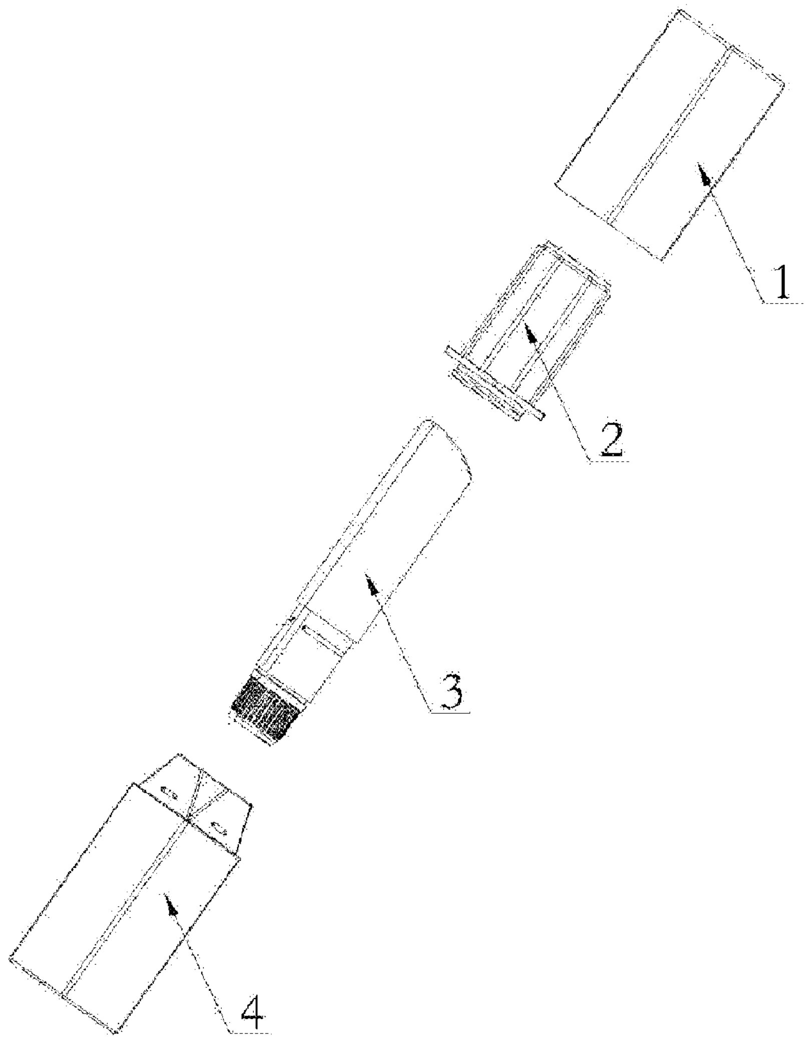
FIG. 1 shows an exploded view of the present utility model embodiment.
Figure 2:
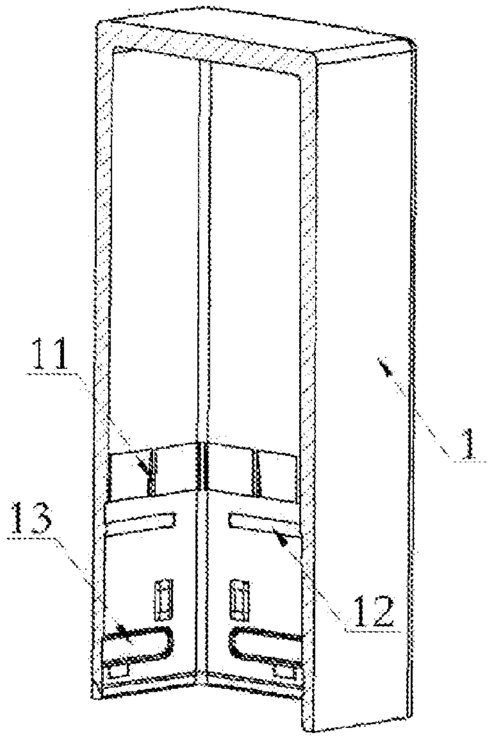
FIG. 2 shows a sectional view of an outer cover of the present utility model embodiment.
Figure 3:
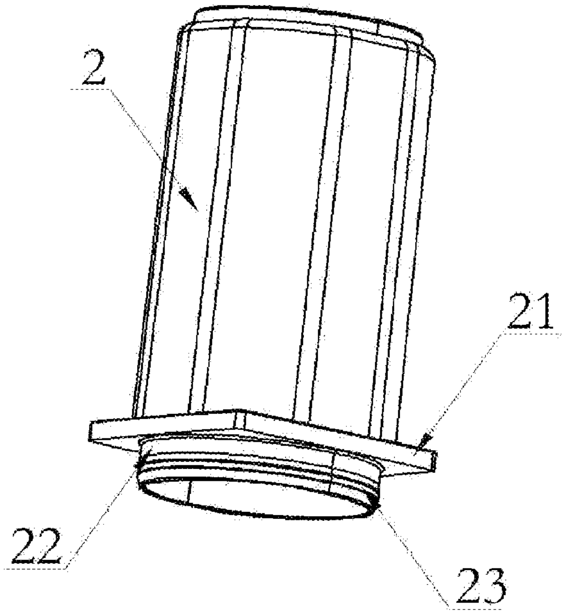
FIG. 3 shows a schematic diagram of an inner cover of the present utility model embodiment.
Figure 4:
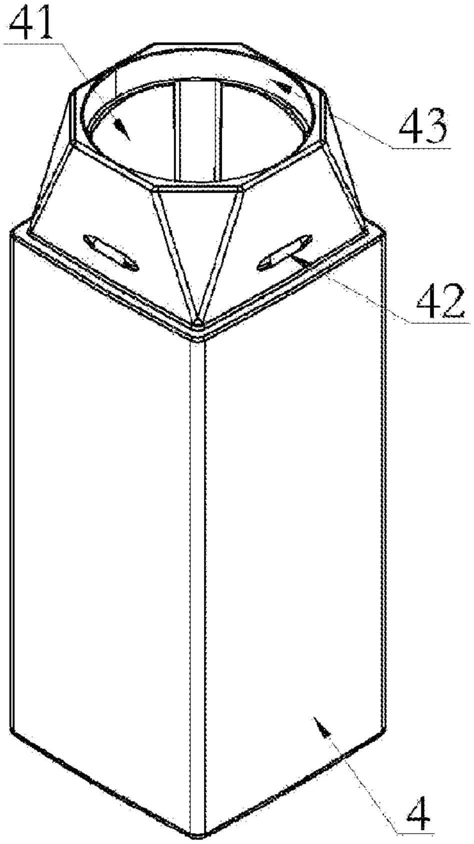
FIG. 4 shows a schematic diagram of a base of the present utility model embodiment.
Figure 5:
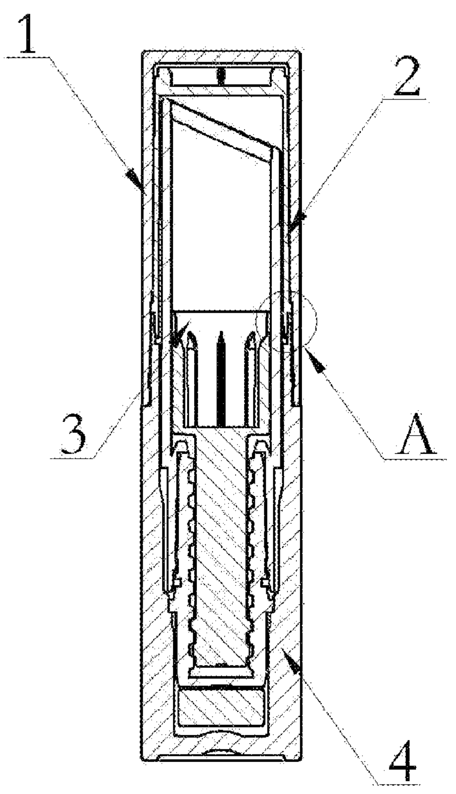
FIG. 5 shows a sectional view of the present utility model embodiment.
Figure 6:
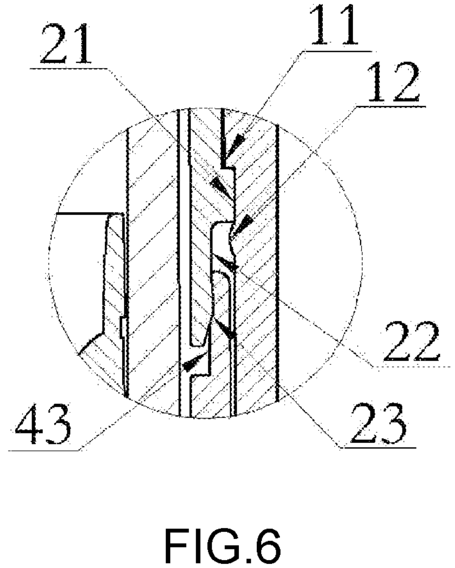
FIG. 6 shows an enlarged view of portion A in FIG. 5.

To better clarify the purposes, technical solutions and advantages of the present utility model, the following will further describe in detail the present utility model with reference to the accompanying drawings FIGS. 1-6.

As illustrated in FIGS. 1-6, an airtight lipstick comprises an outer cover 1, an inner cover 2, a central core 3, and a base 4.

In a middle portion of an inner wall of the outer cover 1, there are a plurality of stop posts 11 and stop protrusions 12, and the stop protrusions 12 are arranged below the stop posts 11. An outer wall of the inner cover 2 is provided with a clamping portion 21. The clamping portion 21 is clamped between the stop posts 11 and the stop protrusions 12, so that the inner cover 2 is fixedly clamped inside the outer cover 11.

The central core 3 is adapted to accommodate a lipstick mass, the base 4 is provided with a cavity 41 inside, and the central core 3 is partially sleeved by the cavity 41 and partially protrudes out of the base 4.

A bottom portion of the inner wall of the outer cover 1 is provided with a plurality of grooves 13, while the base 4 is provided with a plurality of strip protrusions 42 matching with the grooves 13, and the outer cover 1 is matingly snapped to an upper part of the base 4 through cooperation between the grooves 13 and the strip protrusions 42.

A lower part 22 of the inner cover 2 is inserted into the base 4. An upper portion of an inner wall of the base 4 is provided with a sealing portion 43. A sealing convex ring 23 is provided on an outer wall of the lower part 22 of the inner cover 2 or on the sealing portion 43. In the present embodiment, the sealing convex ring is preferably arranged on the outer wall of the lower part 22 of the inner cover 2. When the lower part 22 of the inner cover 2 is inserted into the base 4, the sealing convex ring 23 will press against the sealing portion 43, such that the lower part 22 of the inner cover 2 and the sealing portion 43 are configured to be in interference fit with respect to each other, thereby sealing and providing airtightness to the cavity 41. As such, the external air is isolated from being in contact with the lipstick mass accommodated in the central core 3, thereby preventing the lipstick mass from contamination and loss of moisture.

Obviously, the aforementioned embodiments are only intended to illustrate the technical concept and characteristics of the present utility model to enable those skilled in the art to understand and implement accordingly the contents of the present utility model. The embodiments should not limit the scope of protection of the present utility model; all modifications made in accordance with the essence of the main technical solution of the present utility model shall fall within the protection scope of the present utility model.

What is claimed is:

1. An airtight lipstick, comprising an outer cover, an inner cover, a central core and a base; the inner cover is fixedly arranged inside the outer cover; the base is internally provided with a cavity; the central core is arranged within the cavity; the central core is adapted to accommodate a lipstick mass; a bottom part of the outer cover removably snaps onto the base; a lower part of the inner cover is in an interference fit with an upper portion of an inner wall of the base to achieve sealing effect.

2. The airtight lipstick as in claim 1, wherein the lower part of the inner cover is inserted into the base, and the upper portion of the inner wall of the base is provided with a sealing portion that is in interference fit with the lower part of the inner cover; the lower part of the inner cover is matingly connected to the sealing portion, so as to render the cavity hermetic and airtight.

3. The airtight lipstick as in claim 2, wherein a sealing convex ring is provided on an outer wall of the lower part of the inner cover or on the sealing portion.

4. The airtight lipstick as in claim 1, wherein a middle portion of an inner wall of the outer cover is provided with a plurality of stop posts and stop protrusions; the stop protrusions are arranged below the stop posts; a middle portion of an outer wall of the inner cover is provided with a clamping portion, and the clamping portion is clamped between the stop posts and the stop protrusions, so that the inner cover is fixedly clamped inside the outer cover.

5. The airtight lipstick as in claim 1, wherein a bottom portion of an inner wall of the outer cover is provided with a plurality of grooves; an upper part of an outer wall of the base is provided with a plurality of strip protrusions, and the outer cover is matingly snapped to an upper part of the base through the grooves and the strip protrusions.

* * * * *